United States Patent [19]

Disalvo

[11] Patent Number: 5,154,017
[45] Date of Patent: Oct. 13, 1992

[54] RODENT TRAP WITH SIGNAL

[76] Inventor: Herbert R. Disalvo, 1191 Palm Blvd., Dunedin, Fla. 34698

[21] Appl. No.: 807,244

[22] Filed: Dec. 16, 1991

[51] Int. Cl.⁵ .................................. A01M 23/30
[52] U.S. Cl. ........................................... 43/81
[58] Field of Search .............. 43/58, 81, 82, 98, 96, 43/75; 340/573, 540

[56] References Cited

U.S. PATENT DOCUMENTS

| | | | |
|---|---|---|---|
| 1,290,697 | 1/1919 | Banash | 43/81 |
| 2,554,728 | 5/1951 | Barber | 43/96 |
| 4,517,557 | 5/1985 | Agron | 43/82 |
| 4,719,718 | 1/1988 | Kon | 43/81 |
| 4,890,415 | 1/1990 | Fressola | 43/58 |

Primary Examiner—Kurt C. Rowan
Attorney, Agent, or Firm—Harold D. Shall

[57] ABSTRACT

A spring loaded rodent trap including a signalling device in a circuit which includes the killing member of the rodent trap and a resilient member engaged by said killing member when it moves toward its tripped position. The resilient member having a substantial free height and being deflectable to a minimal height.

4 Claims, 2 Drawing Sheets

RODENT TRAP WITH SIGNAL

BACKGROUND OF THE INVENTION

1. Field of the Invention

This invention relates to rodent traps in general and more particularly to a self contained rodent trap with a built in signal device or alarm and an attached power source so that when the trap is sprung a signal is given.

2. Description of Prior Art

U.S. Pat. No. 4,517,557 shows a housing for a rodent trap which, when the trap is sprung, and jumps from the housing, causes actuation of a remote signal device. However, this arrangement has many short comings the main ones being that if the trap becomes wedged in the housing the signal will not be given or if the rodent crawls away with the trap, because it merely engaged a leg, the trap will be difficult to find.

SUMMARY OF THE INVENTION

A rodent trap with a signal wherein the trap portion is a conventional spring actuated trap with a non-conductive base and including a signal device, a power source in the form of a battery secured to the base, and a circuit which includes portions of the spring actuated trap. The switch for the circuit signal includes the killing member of the trap and an engaging spring engaged by the killing member when it is sprung. The engaging spring is carried by the base, has a substantial free height when not engaged, is easily deflected toward the base to a minimal height when engaged by the killing member to close the circuit and thereby signal that the trap has been activated.

DESCRIPTION OF THE PREFERRED EMBODIMENT

Figure 1:
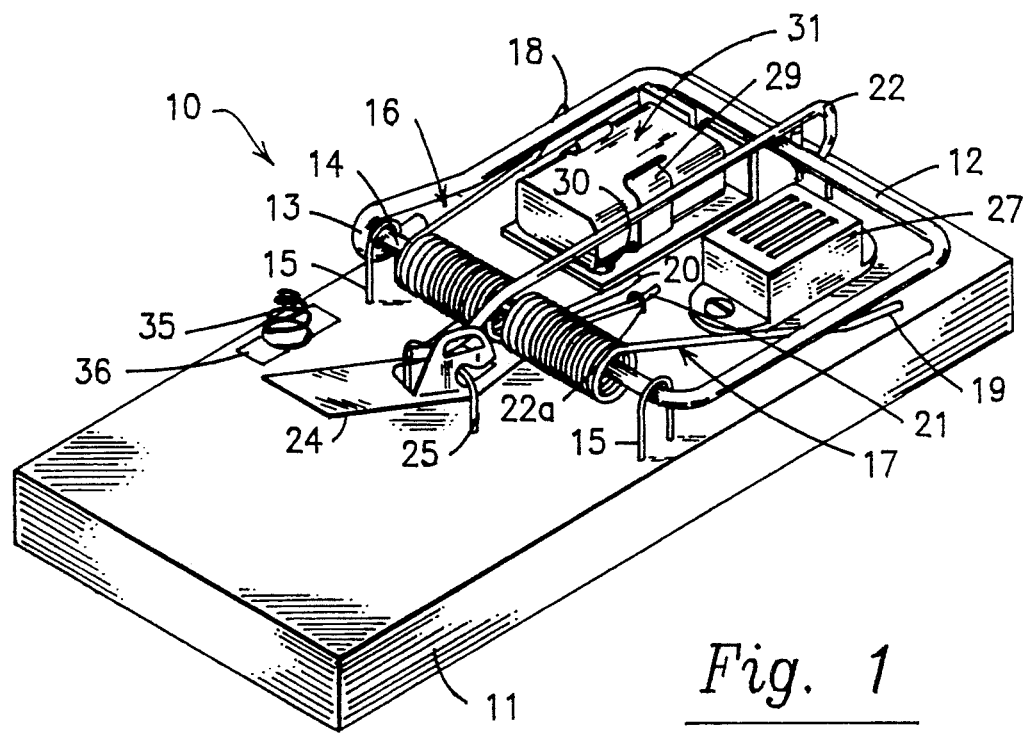
FIG. 1 is a perspective view of a rodent trap with a signalling device according to this invention.

The rodent trap 10 includes the usual wooden base 11 upon which the various elements are secured. It is desirable that the base 11 be made of wood, but other non-conducting, impact resistant materials would suffice for this invention.

A killing member 12 is rectangular in shape and is made from a conductive material such as steel wire. It is bent in its closed rectangular shape and then a loop 13 in one end is bent around the adjacent end 14 to close and maintain the rectangular shape. A pair of laterally spaced "U" shaped staples 15 are received over the killing member 12 and secured in the wood base 11 to pivotally mount the killing member 12 to the base 11 for easy movement between its positions shown in FIGS. 2 and 3.

Figure 2:
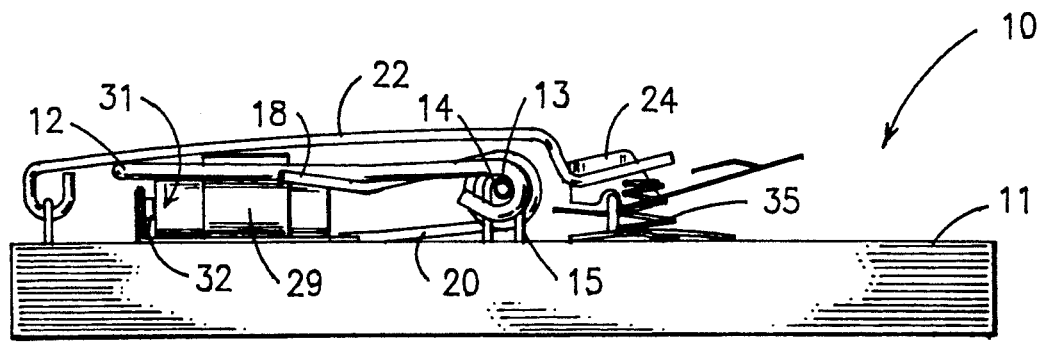
FIG. 2 is a side elevational view of a device according to this invention in the "set" position.

A pair of actuating coil springs, a left spring 16 and a right spring 17 as seen in FIG. 1, which have outer legs 18 and 19 respectively, as seen in FIG. 1, are pressed under the killing member 12, and a pair of inner legs 20 and 21, respectively, which are pressed against the wooden base 11. The coil springs 16, and 17 are made of a conductive metallic material and the spring 17 has a staple 22a secured over the inner leg 21 and into the wooden base 11 to hold the springs in position. When the killing member 12 is in its position shown in FIGS. 1 and 2, the springs 16 and 17 are coilingly compressively loaded, whereas when the spring 16 (and also the spring 17 not shown in FIG. 3) are in the position shown in FIG. 3, they are still compressively loaded but to a slightly lesser degree than as shown in FIGS. 1 and 2.

Figure 3:
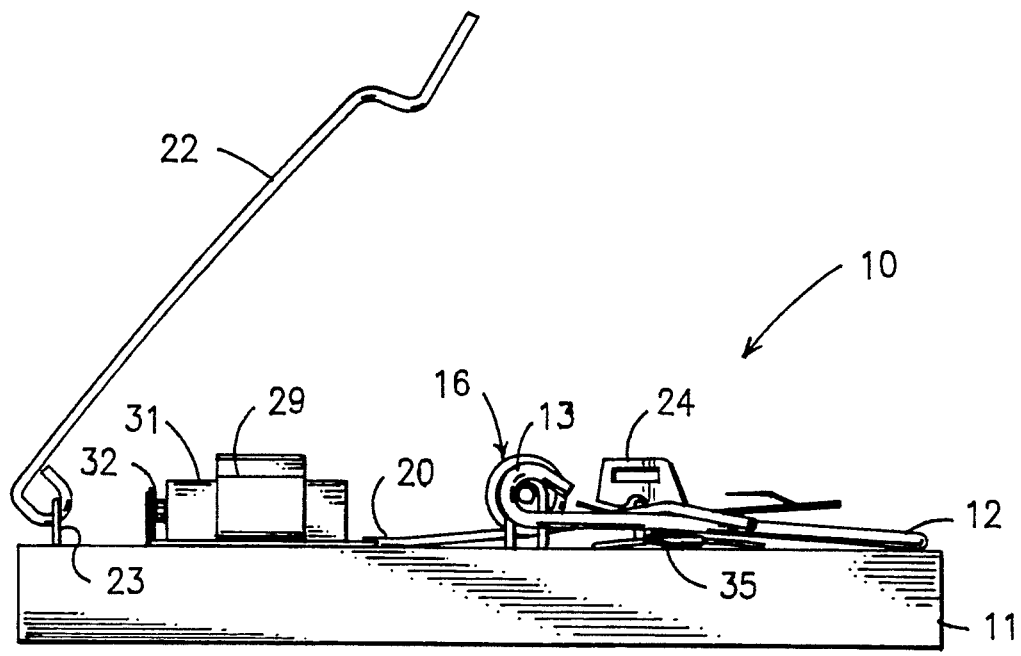
FIG. 3 is a side elevational view of a device according to this invention in the "sprung" position showing the killing member engaging and compressing the engaging spring.
Figure 4:
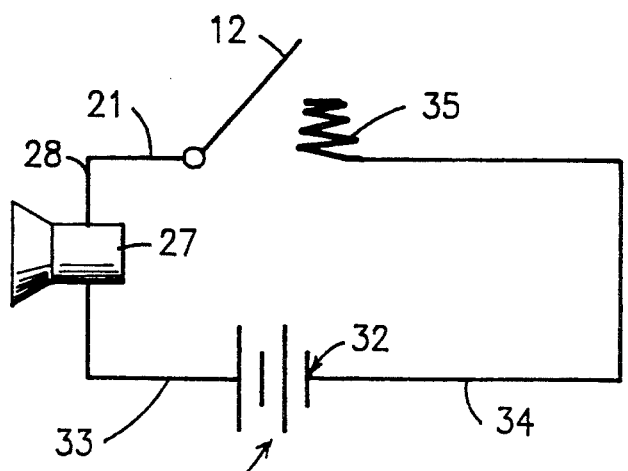
FIG. 4 is a circuit diagram showing the connection between the killing member, the engaging spring, the battery and the signalling device.

A conventional trip rod 22 is secured to the base 11 by a staple 23 and a conventional trip lever 24 is secured to the base 11 by a staple 25. As seen in FIGS. 1 and 2, the trip rod and trip lever 22 and 24 hold the killing member 12 in its "set" position. FIG. 3 shows the rod 22 and lever 2 in their "tripped" position.

What has been described so far is a conventional rodent trap, which, if its in a location where it cannot be seen, is difficult to tell if it has been activated by a rodent and therefore needs attention. To enable an operator to tell from a remote location that the rodent trap has been activated, a signal device according to this invention is provided.

More particularly, a nine volt D.C. buzzer 27 is secured to the base 11 and connected by a lead 28 to the leg 21 of the spring 17, so that spring 17 is part of the circuit. Spring 17 engages killing member 12 so that the latter is also a part of the circuit. A mounting bracket 29 is secured to the base 11 as by four screws, one of which is shown in FIG. 1 by the numeral 30, which bracket slidingly mounts a nine volt battery 31 therein such that the terminals, (the negative terminal is shown at 32 in FIGS. 2 and 3) contact terminals carried by the bracket 29 (not shown).

The positive terminal of the battery is connected to the D.C. buzzer 27 by a lead 33, while the negative terminal of the battery is connected by a lead 34 to an easily deflectable conductive engaging spring 35 The spring 35 is secured to the wood base 11 as by a staple plate 36 and is located such that when the trap 10 is set, as seen in FIGS. 1 and 2, it has a substantial free height and is located in a position where it will be engaged and deflected to a very minimal height by the movement of the killing member to its killing position as seen in FIG. 3. A conical coiled compression spring 35 is shown in the drawings but it should be understood that other springs having a substantially high free height and which are easily deflectable to minimal height can also be used. When deflected to a minimal height, the spring 35 should feed back a very minimal reactive load to the killing member 12 so as to detract as little as possible from the killing load imposed on the member 12 by the springs 16 and 17.

The leads 28, 33 and 34 are preferably run in grooves (not shown in the drawings) under the base 11 and then up from the grooves and to the member to which they are connected to inhibit the rodent from chewing therethrough. A cover (not shown) is secured over the bottom to cover the grooves.

When the killing member 12 engages the spring 35, the circuit is complete, since they act as a switch, and the buzzer 27 will sound until the killing member is lifted or until the battery 31 is moved in the bracket 29 away from the terminals. It should be understood that buzzers and batteries of other voltages than nine volts can also be used in this invention.

In accordance with the provisions of the patent statutes, the principal and mode of operation of the invention have been described and illustrated in its preferred embodiment. However, it must be understood that the invention can be practiced otherwise than as specifically illustrated and described without departing from its spirit or scope.

What is claimed is:

1. A spring loaded trigger activated rodent trap having a base and a killing member and with a signalling device which is activated when the killing member moves from its set position toward its tripped position comprising in combination
   a) a D.C. buzzer signalling device;
   b) a battery of a voltage compatible with said buzzer;
   c) said buzzer and said battery being mounted on said base of the trap;
   d) a resiliently deflectable means having a substantial free height and being deflectable to a minimal height;
   e) said deflectable means being secured to said base and being positioned so as to be contacted and deflected by, said killing member as the latter moves toward its tripped position;
   f) spring means for moving said killing member to its tripped position, and
   g) means forming a circuit between said battery and said buzzer including said spring means, said deflectable means and said killing member.

2. A device according to claim 1 wherein when said killing member is in its tripped position, said battery can be disconnected from said buzzer.

3. A device according to claim 1 wherein said resilient means provides a minimum reactive load so as to minimally detract from the killing load imposed on said killing member by said spring means.

4. A device according to claim 1 wherein said spring means is a coiled spring with a projection at each of its ends, one of said projections being in engagement with said killing member and including wire means connecting said spring means to said circuit.

* * * * *